United States Patent [19]

Lockard

[11] Patent Number: 5,355,383

[45] Date of Patent: Oct. 11, 1994

[54] METHOD AND APPARATUS FOR DETECTION AND CONTROL OF PRELASING IN A Q-SWITCHED LASER

[75] Inventor: George E. Lockard, Newport News, Va.

[73] Assignee: The United States of America as represented by the Administrator of the National Aeronautics and Space Administration, Washington, D.C.

[21] Appl. No.: 988,082

[22] Filed: Dec. 3, 1992

[51] Int. Cl.$^5$ .................................................. H01S 3/00
[52] U.S. Cl. ........................................... 372/38; 372/10; 372/12
[58] Field of Search ............................... 372/10, 12, 38

[56] References Cited

U.S. PATENT DOCUMENTS

| | | | |
|---|---|---|---|
| 4,730,113 | 3/1988 | Edwards et al. | 250/347 |
| 4,740,986 | 4/1988 | Reeder | 372/92 |
| 4,880,978 | 11/1989 | Cohn et al. | 250/332 |
| 4,884,275 | 11/1989 | Simms | 372/38 |
| 4,947,398 | 8/1990 | Yasuda et al. | 372/29 |
| 4,950,268 | 8/1990 | Rink | 372/38 |
| 5,128,949 | 7/1992 | Barnes | 372/25 |

Primary Examiner—Georgia Y. Epps
Attorney, Agent, or Firm—Kimberly A. Chasteen

[57] ABSTRACT

The present invention detects prelasing in a Q-switch laser and terminates laser operation upon such detection. A detector senses the presence of light beyond a Q-switch and generates an appropriate electrical signal. A comparison stage circuit compares this detector signal with an established threshold value indicative of prelasing and generates a trigger signal if this detector signal exceeds this threshold value. A control stage circuit receives both this trigger value and a sampled Q-switch signal indicative of an opening of the Q-switch. The control stage circuit terminates operation of the laser if the trigger signal from the comparison stage is received while the sampled Q-switch signal is being received to avoid the effects of prelasing. Appropriate delays and timing sequences are established.

9 Claims, 5 Drawing Sheets

METHOD AND APPARATUS FOR DETECTION AND CONTROL OF PRELASING IN A Q-SWITCHED LASER

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Technical Field

The present invention relates generally to Q-switched lasers and more particularly to a method and apparatus for the detection and control of prelasing in Q-switched lasers.

2. Discussion of the Related Art

A laser uses the principle of amplification of electromagnetic waves by the stimulated emission of radiation. As shown in FIG. 1, a laser comprises a resonator 12 defining a resonating cavity 14 which contains an appropriate lasing medium M. A pump 16 such as an optical pump excites the lasing medium, stimulating it to emit light. Any conventional excitation method may be employed. A reflecting mirror endplate 18 is located at one end of cavity 14 and a partially transparent, partially reflecting mirror endplate 20 is located at the opposite end. The endplate 20 may be any conventional endplate such as those having silver, metallic or dielectric coatings. Light radiation that is directed along the longitudinal axis of the cavity bounces back and forth between the endplates, further exciting the lasing medium M. The conventional laser fires when the radiation level is sufficient to exit the partially transparent endplate 20.

The output power of pulsed lasers can be greatly increased, with correspondingly shorter pulse duration, by the Q-switch technique. In this method, the optical path between partially transparent endplate 20 and the lasing medium is blocked by a reflective Q-switch shutter 22 controlled by a Q-switch circuit 24. The circuit keeps shutter 22 closed while the lasing medium is excited past the normal lasing level. At a predetermined point, the Q-switch circuit opens the shutter and the stored energy is released in a giant pulse. A good discussion of Q-switches is found in the Background information section of U.S. Pat. No. 4,740,986 to Reeder, the specification of which is hereby incorporated by reference.

In Q-switched pulsed laser systems there is a condition called prelasing which occurs when laser light "leaks" out of the laser cavity prematurely. This leakage is due to the inability of the Q-switch to completely hold off the lasing action of the laser cavity. Due to the optical damage effects associated with prelasing, the condition is considered to be undesirable and needs to be detected and avoided.

The undesirable effects of prelasing fall into two general categories. The first are those directly related to the optical damage effects on the laser system optics and on the optics of the recipient of the laser system output. This optical damage can be quite costly both to the laser manufacturer and the laser user due to both the financial costs associated with the replacement cost of the optics and the system down time necessary to correct the damage. This repair down time is usually quite inconvenient and annoying. The second category includes those problems not related to optical damage effects but to the effects on the applications of a prelasing laser beam. Detrimental effects on the laser output applications would include those associated with multiple output beams, varying energy per laser pulse, changing average output power and output pulsewidth problems.

OBJECTS

It is accordingly an object of the present invention to detect prelasing in a Q-switched laser system.

It is another object of the present invention to terminate operation of Q-switched laser when prelasing has been detected.

It is a further object of the present invention to prevent optical damage effects associated with prelasing.

It is another object of the present invention to reduce energy variance per laser pulse.

It is a further object of the present invention to reduce changes in the average output power of a Q-switched laser system.

It is yet another object of the present invention to achieve the foregoing objects simply.

Other objects and advantages of the present invention are apparent from the specification and drawings which follow.

SUMMARY OF THE INVENTION

The foregoing and additional objects are achieved by a method and apparatus according to the present invention. A detector senses the presence of light at a point beyond a Q-switch and partially transparent endplate of a laser resonator cavity and generates an appropriate electrical signal. A comparison stage circuit compares this detector signal with an established threshold value indicative of prelasing and generates a trigger signal if this detector signal exceeds this threshold value. A control stage circuit receives both this trigger value and a sampled Q-switch signal indicative of an opening of the Q-switch. The control stage circuit terminates operation of the laser if the trigger signal from the comparison stage is received before the sampled Q-switch signal is being received to avoid the effects of prelasing. Appropriate delays and timing sequences are established.

DETAILED DESCRIPTION OF THE INVENTION

Figure 2:
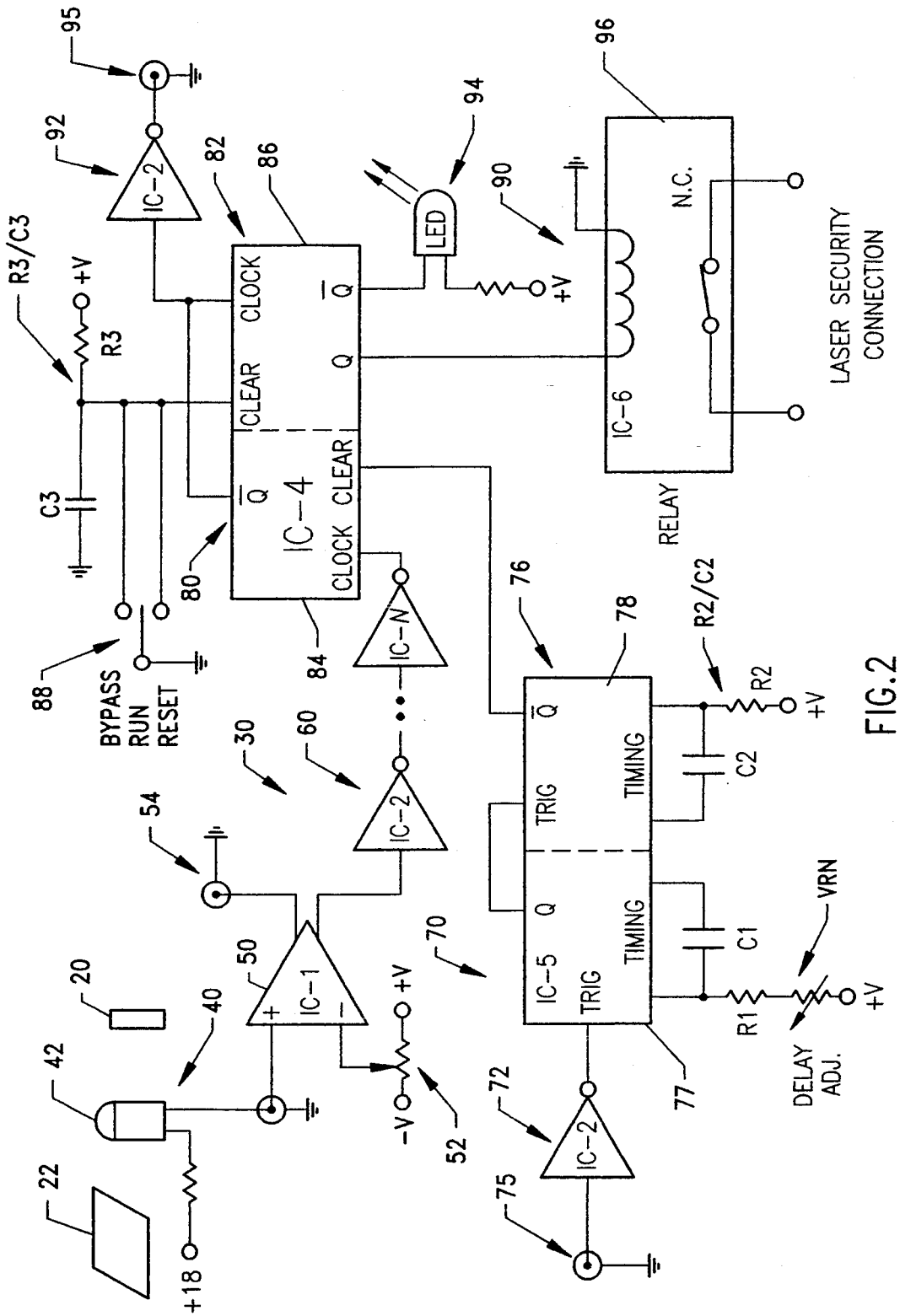
FIG. 2 is simplified circuit schematic for a prelasing detection and control circuit according to the present invention.

The present invention is a method and apparatus to detect prelasing in a Q-switched laser system. The invention is described in particular nonlimiting circuit embodiment 30 depicted in FIGS. 2 and 3.

This depicted circuit 30 was specifically designed to detect prelasing in Nd:Yag pulsed lasers operating at a 10 Hz repetition rate and, once detected, to shut down the system before the next occurring laser firing. The output coupler mirrors in this laser were dielectrically coated as are most mirrors in solid state lasers subject to prelasing. Operation of the circuit 30 is based on the premise that the desired laser output occurs after the Q-switch operation and that any other signal which is present before that moment is to be considered prelasing. All that is needed to integrate the circuit into the laser system is access to the laser light, the Q-switch trigger pulse and the laser security interlock line.

The basic circuit 30 consists of six sections, namely, an optical detection stage 40, a comparison stage 50, a delay stage 60, a sync input stage 70, a control stage 80 and an output stage 90. In general terms, the optical detection stage 40 converts an optical signal indicative of prelasing into an electrical signal 40 to trigger the comparison stage 50 which also receives a threshold value indicative of prelasing. If the threshold value is exceeded, this trigger signal is delayed by the delay stage 60 and then sent to the control stage 80. The Q-switch signal is sampled by the sync input stage 70 which conditions and provides a variable delay to the sync signal which is also sent to the control stage 80. The control stage 80 compares the timing of these signals and generates a signal or null to control the output stage 90.

Figure 3:
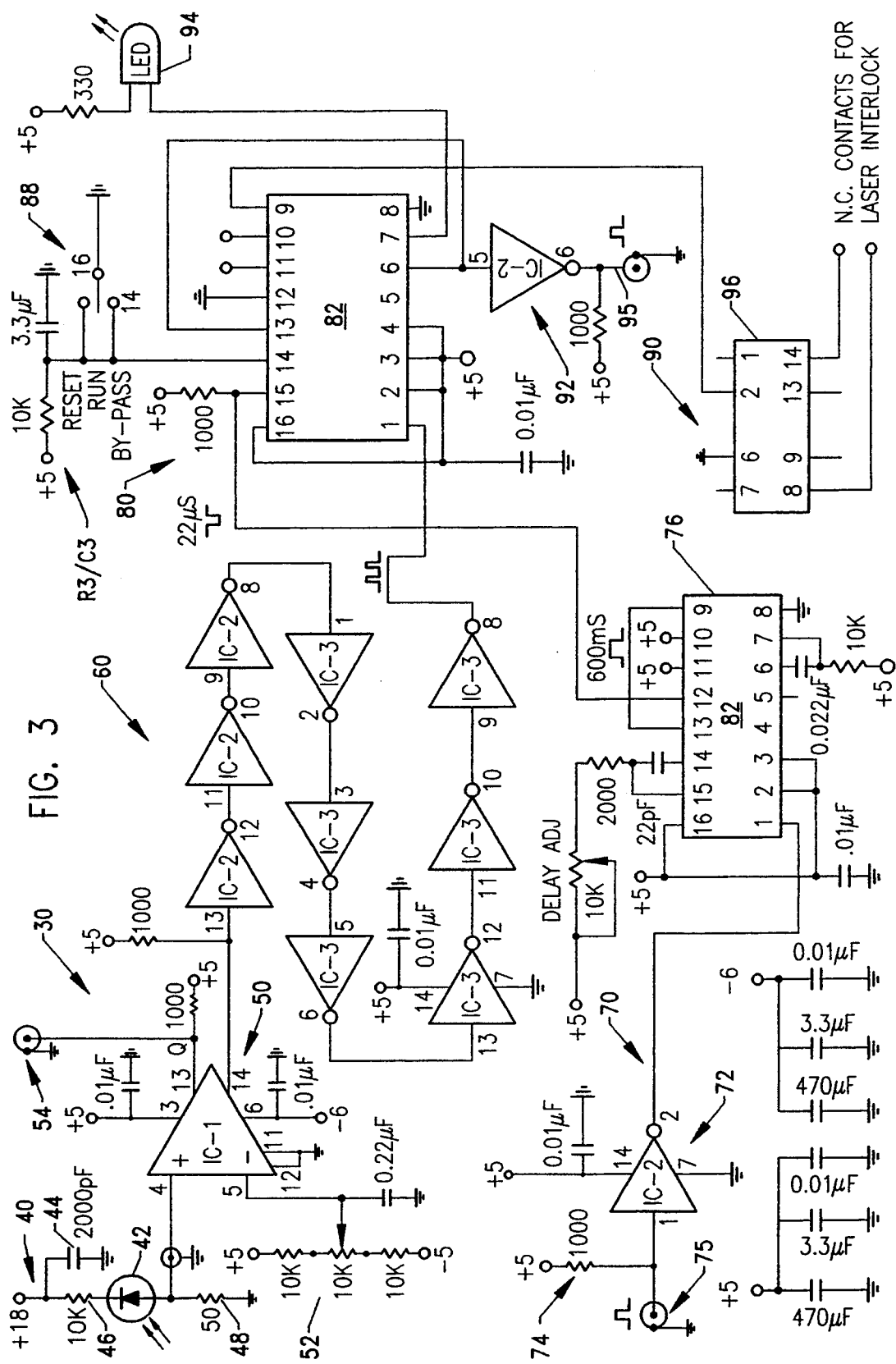
FIG. 3 is a detailed circuit schematic for a particular embodiment of the present invention.

Specifically, the optical detection stage 40 consists of a high speed small area silicon PIN diode detector 42 operated in the reverse biased mode and located between Q-switch reflective shutter 22 and partially transparent endplate 20. The location of prelasing detector 42 need not be limited to the laser cavity but can be in the optical path at a point beyond the Q-switch. This mode of operation provides for very fast detector response times and high signal sensitivity. The detector 42 senses light present between the shutter and endplate and generates an electrical signal indicative of the light intensity. As shown in FIG. 3, the specific associated circuitry contains a 2000 pF power supply noise filter capacitor 44, a 10K bias voltage current limiting resistor 46 and a 50 ohm output termination resistor 48 for the detector. This whole optical detection stage 40 can easily be located away from the rest of the circuitry so long as proper transmission line principles are adhered to, thereby simplifying the installation of the circuit with the laser system.

A particular silicon photodiode detector 42 used has an optical response from 350 nm to 1100 nm, such as Model 1188-06 available from Hamamatsu. In flashlamp pumped or frequency doubled systems, there is more than just a single frequency optical signal available in the area of interest. In a particular application, the multi-spectrum pulse from the flashlamp, the 1060 nm fundamental laser output and the 532 nm doubled laser output pulses were available. A filter can be placed in front of the detector to limit the detector signal to adjust the desired laser light wavelength. In a particular application, the 532 nm output pulse was monitored.

The optical circuit 40 will readily work with detectors used for other wavelengths provided the detectors supply voltage signals that are impedance matched to the rest of the circuit. The speed of the detector selected will determine the maximum speed of the system. This enables the basic circuit to be used with practically any pulsed Q-switched laser system regardless of the operating optical output wavelength.

In fact, after the detection stage 40 has converted the optical signal to an electrical signal, the prelase circuit 30 becomes totally insensitive to the source of the electronic signal which is sent to the comparison stage 50. Because of this the circuit could be easily adapted for use in purely electrical/electronic applications.

The comparison stage 50 is based around a high speed voltage comparator IC-1 (integrated circuit or chip) with TTL (transistor/transistor logic) complementary outputs such as Model AD9686TQ commercially available from Analog Devices Corporation. The noninverting input signal is supplied by the optical detection stage 40, while the inverting input signal indicative of a threshold value of prelasing condition is derived from an adjustable voltage divider such as a potentiometer 52. The voltage divider provides both positive and negative voltage references for the comparator IC-1, enabling the comparator to trigger off either voltage polarity signal from the optical detection stage 40. This enables the detection stage 40 to be changed at any time without having to modify the rest of the circuit. The voltage reference was designed around a potentiometer 52 mounted on the front of the circuit enclosure. This provides for operator control of the trigger level indicative of a threshold prelasing value after installation of the circuit into the laser system. The external adjustment potentiometer 52 could be mounted on the printed circuit board for preset voltage reference applications, thereby saving space and cost.

As noted, the comparator integrated circuit IC-1 has two complementary TTL outputs. The inverted TTL output goes to the delay stage 60 while the noninverted TTL output goes to the comparator monitor 54. The comparator monitor signal is used by the operator when adjusting the voltage reference potentiometer 52.

The next stage is the delay stage 60 comprising a series of CMOS (complementary-metal-oxide-semiconductor logic) inverters designated IC-2 . . . IC-N in FIG. 2 connected in series, wherein N is an integer. This delay stage 60 generates a fixed delay which is necessary to compensate for the differences in the circuit-generated delays between the optical monitor signal detected by detection circuit 42 and the Q-switch monitor signal provided by Q-switch circuit 24. In the particular embodiment shown in FIG. 3, three IC-2 integrated circuits are shown, wherein IC-2 is a Model 74HC14 commercially available from National Semiconductor Corporation and six IC-3 integrated circuits are shown, wherein IC-3 is also a Model 74 HC14. Both the IC-2 and IC-3 contained six inverter gates. Since nine invertor gates were used for the delay stage, two integrated circuits or chips were needed. Although integrated circuit nanosecond delay lines are available for this purpose, the inverters were selected due to their relatively low cost. Another advantage in using the inverters is the pulsewidth stretching effect inherent with their usage. Although this increase in pulsewidth limits the minimum time between the prelase signal and the lasing signal, it does ensure adequate pulsewidths for the control stage signals, especially when dealing with extremely narrow laser pulses.

At this point the optical signals have been detected, converted to digital voltage levels and delayed. These optical monitor signals go to the control stage 80 along with the below described Q-switch monitor signal from the sync stage 70.

The sync stage 70 consists of two integrated circuits. The first is a high speed CMOS Schmitt-Trigger inverter 72 with a pull-up resistor 74 that is used to sample the Q-switch trigger signal of Q-switch circuit 24 which opens shutter 22 at Q-switch input 75 connected to Q-switch circuit 24 while buffering the circuit from the laser electronics. Its output goes to a CMOS dual nonretriggerable monostable multivibrator integrated circuit IC-76 such as Model 74HC221AN commercially available from National Semiconductor Corporation, whose first multivibrator section 77 is connected to trigger off the falling edge of the inverter output signal, i.e., the sampled Q-switch signal. The output pulsewidth of the first multivibrator 77 is controlled by the R/C time constant of a fixed resister/fixed capacitor, R1/C1, and variable resistor network VRN. The fixed resistor R1 sets the minimum pulsewidth while the variable resistor VRN is used to vary the pulsewidth from that minimum.

The variable pulsewidth output pulse from the first multivibrator 77 is used to trigger the second multivibrator 78 whose output pulsewidth is set by a fixed R/C network R2/C2. The second multivibrator 78 is designed to trigger off the trailing edge of the output pulse of the first multivibrator state 77 which provides a variable delay from the original Q-switch signal that is equivalent to the variable pulsewidth of the first multivibrator. This fixed pulsewidth pulse from the second multivibrator goes to control stage 80 as the Q-switch sync signal.

In this configuration, the dual multivibrator chip 76 serves two functions. It provides a trigger signal to the control stage 80 whose pulsewidth is independent of the original Q-switch pulsewidth. It also provides a variable delay for the trigger signal. It is this variable timing adjustment that is used to set the optimum timing for the control stage for a particular application.

Now that the Q-switch monitor sync signal has been generated, it along with the previously described optical monitor signal are integrated in the control stage 80.

Figure 4:
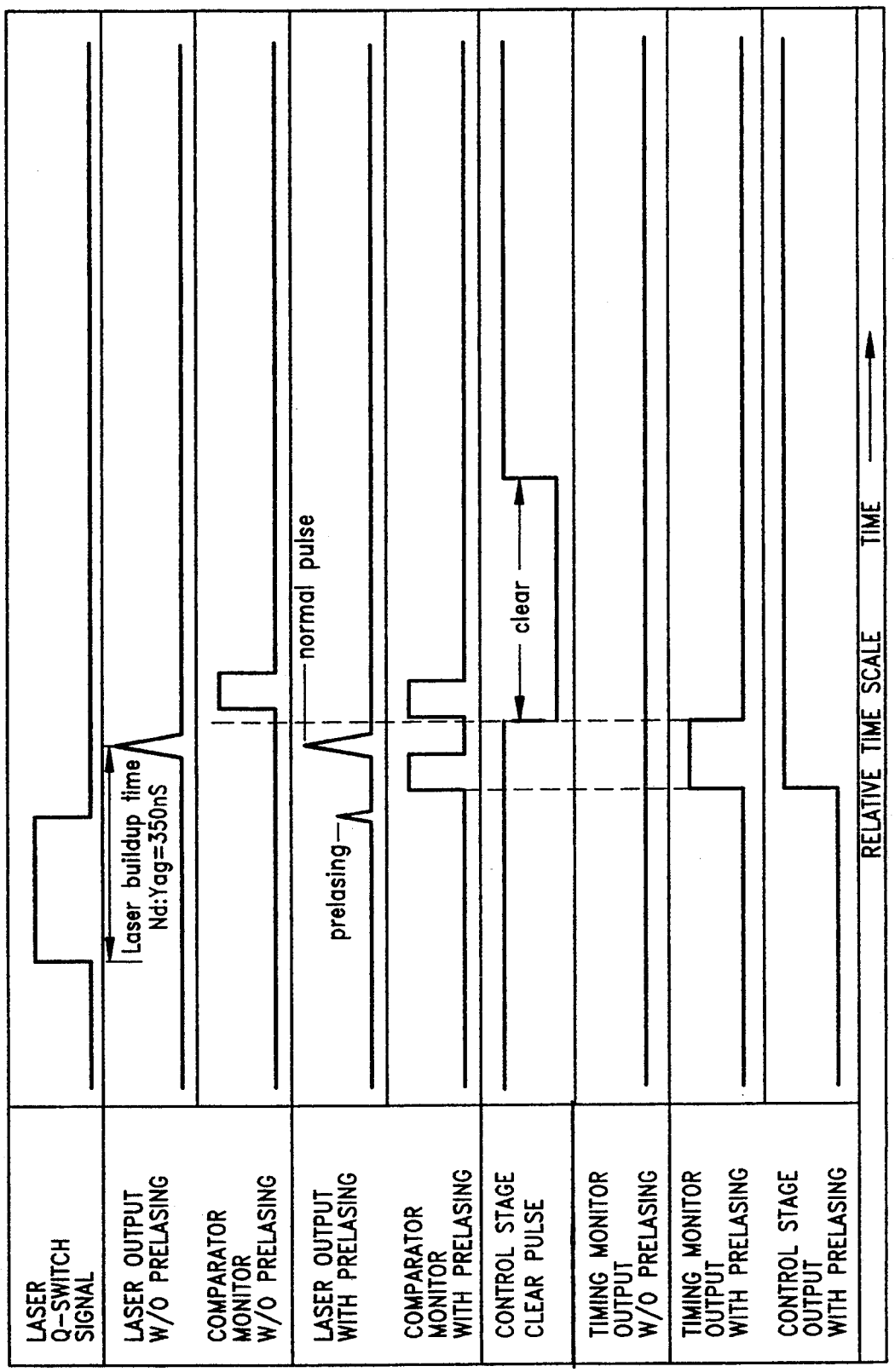
FIG. 4 is a relative timing diagram for the circuits of FIGS. 2 and 3.

The control stage 80 is made up of a CMOS dual J/K flip-flop IC 82, such as Model 74HC112 commercially available from National Semiconductor Corporation, having preset and clear options. The relative timing diagram for the circuit is shown in FIG. 4. The first flip-flop 84 is connected to toggle off the optical monitor signal with the sync signal acting as a clear control signal. The timing of the sync signal is set just slightly before the normal lasing pulse. The sync signal holds the clear line of the first flip-flop 84 high and as long as the clear line is held high the first flip-flop ignores the toggle input from the optical monitor signal. But should a toggle pulse occur before the Q-switch monitor pulse can clear the flip-flop, then that signal will toggle the flip-flop, generating a square wave output signal pulse. This earlier toggle pulse is the pulse generated due to prelasing.

Thus, during normal lasing the first flip-flop generates no output signals while during prelasing it generates a pulse whose pulsewidth varies as a function of the time between the prelase pulse and the Q-switch sync monitor.

This output pulse acts as a toggle signal for the second flip-flop 86. Like the first, the second flip-flop is also connected in the toggle mode except that once toggled the second flip-flop must be manually reset before its output will change. The clear command of the second flip-flop is controlled from a three position switch 88 whose functions are run, by-pass and reset. In the run mode the clear function is held inactive so that the flip-flop output toggles normally on command. The by-pass mode holds the clear function activated so that the output of the flip-flop 86 never changes state regardless of its input. The reset mode provides a manual clear command to reset the output of the flip-flop after being toggled in the run mode.

A resistor and capacitor R/C network R3/C3 is connected to the clear command of the second flip-flop 86 to provide a start-up delay for the associated clear line. This ensures that the second flip-flop is always in the deactivated mode after being powered up.

A trigger monitor signal and a triggered indicator are provided by an inverter 92 and a light emitting diode LED 94, respectively. The monitor signal from the inverter 92 is displayed by a timing monitor 95 and is used by the operator in setting up the timing relationship of the signal monitor and Q-switch sync signals to the two flip-flops. Also, the LED 94 provides an indication to the laser operator during normal operation that the laser has shut down due to the presence of prelasing. The output of the second flip-flop 86 goes to the output stage which consists of a relay IC-96 which opens up the laser security line when energized to shut down the laser. The relay IC-96 can be a DIP Reed Relay Model W171DIP-17 commercially available from Magnacraft Corporation and having a frequency less than 1 kHz.

The degree of circuit sensitivity is dependent on the trigger level and placement of the optical detector 42. The detector sensitivity is extremely high and can easily become saturated resulting in distorted output pulses. Care must be taken in the placement of the detector to avoid this.

Alignment of the detector is not very difficult and is done with the control switch in the bypass mode and the laser operating normally. The output of the detector is monitored on a scope during its positioning. The operator ensures that the detector is not saturated and that there is ample signal for the circuit. Another channel of the oscilloscope is connected to the comparator monitor. The trigger level is adjusted until a signal is detected on the comparator monitor.

Adjustment of the circuit timing is also quite simple. The timing monitor signal is observed on an oscilloscope which is triggered on the laser Q-switch sync signal. The delay potentiometer is adjusted so that a square wave pulse is observed on the oscilloscope. When the laser is not prelasing an output pulse on the timing monitor indicates that the variable Q-switch sync signal is resetting the control stage after the normal lasing pulse occurs. The operator simply adjusts the delay potentiometer. As the timing approaches the desired position the pulsewidth of the timing monitor signal will reduce. At the point where the timing monitor pulse disappears the correct timing relationship between the control stage signals have been achieved. The operator switches the control switch to the run mode and removes the oscilloscope.

Figure 1:
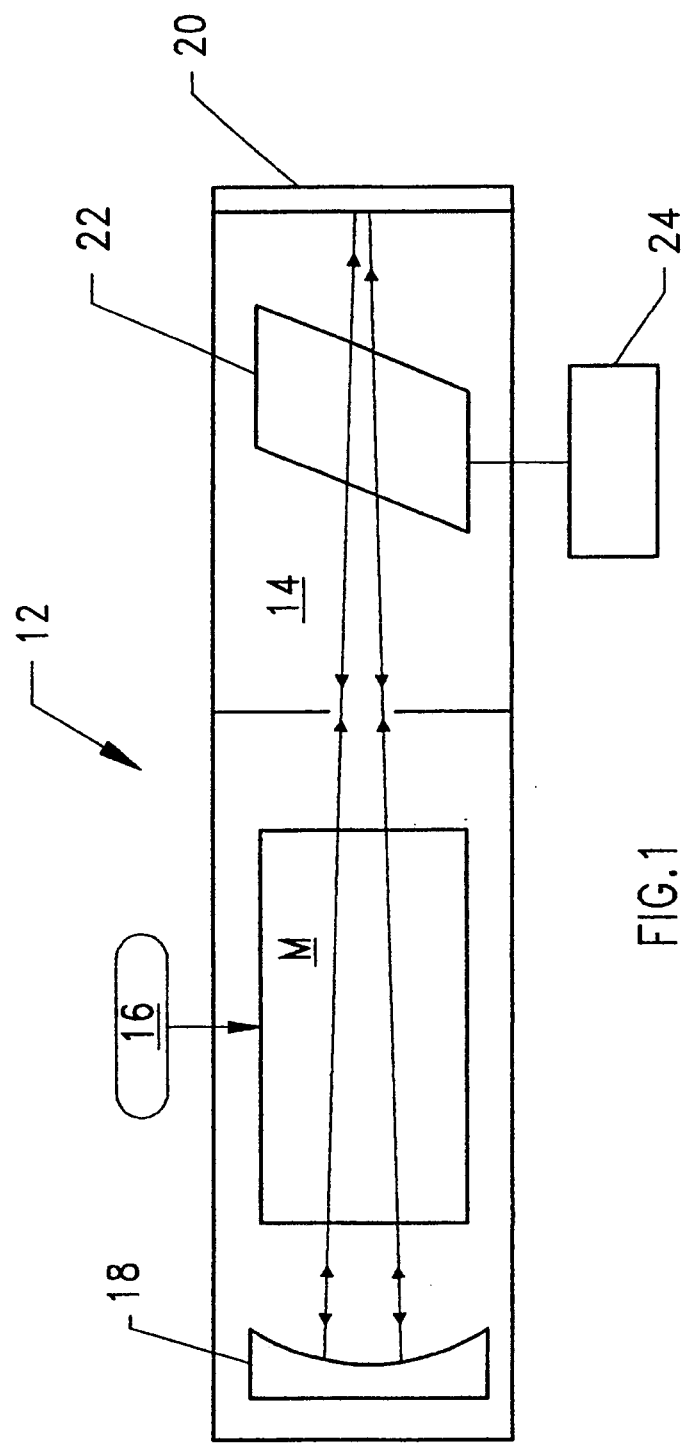
FIG. 1 is a schematic of a prior art laser resonating cavity employing a Q-switch.
Figure 5:
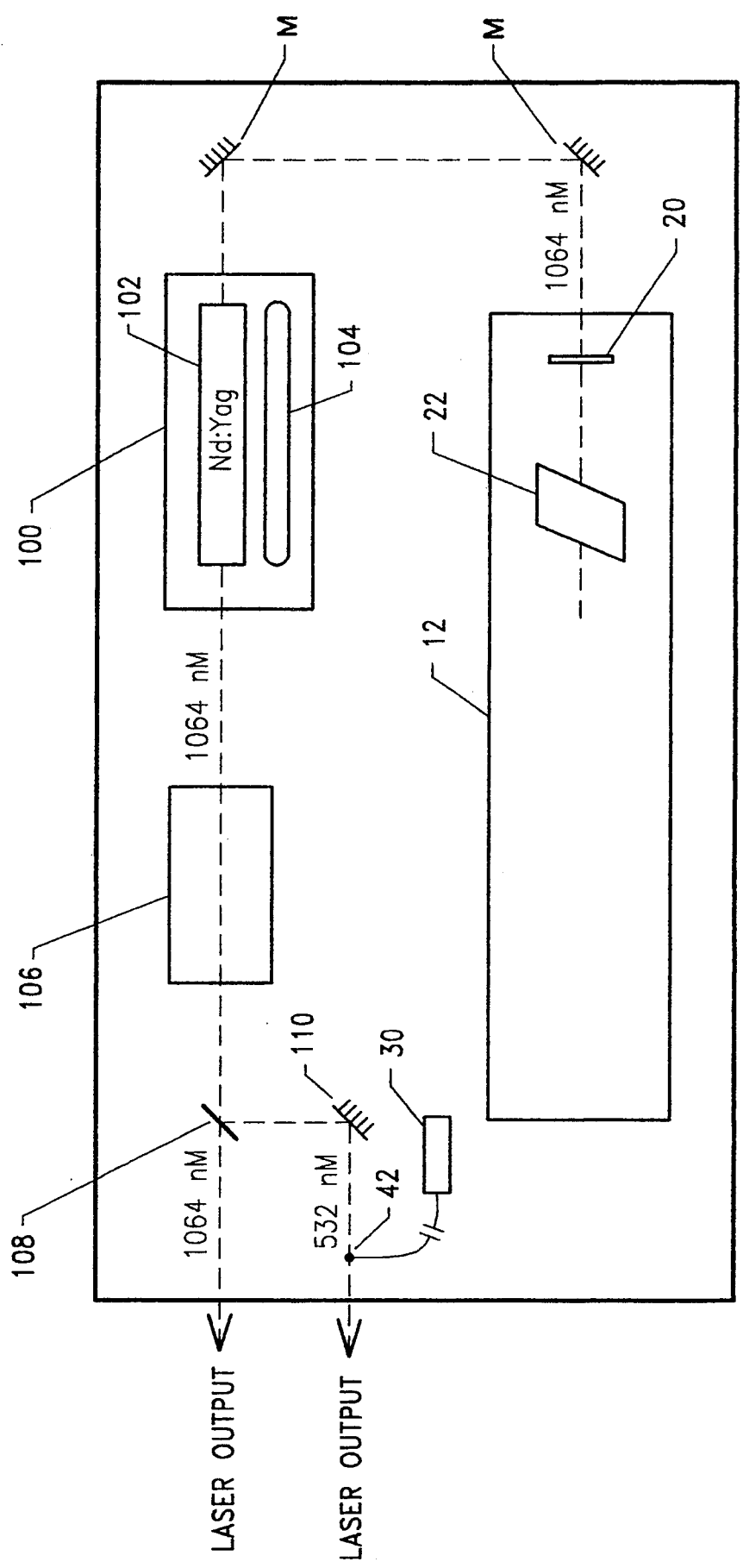
FIG. 5 is a schematic of a frequency doubled laser employing the present invention.

This prelasing detection circuit has been tested on a commercial Nd:Yag laser package whose output was frequency doubled to 532 nm or 0.532 microns. As shown in FIG. 5 the laser package comprises the laser oscillator cavity of FIG. 1. The 1064 nm output is directed by appropriate mirrors M through an optical amplifier 100 comprising an Nd:Yag rod 102 powered by a flashlamp 104. The amplified output passes through a single harmonic generator frequency doubler 106. A transmitting-reflecting mirror 108 transmits light having a wavelength of 1064 nm and reflects light having a wavelength of 532 nm. The transmitted 1064 nm light is then output. The reflected 532 nm light is reflected by a mirror 110 and also output. The light detector 42 is placed at any point beyond the Q-switch in the optical path, and in the particular example after the transmitting-reflecting mirror 108.

The prelasing detection circuit was also electrically tested to determine the timing relationship parameters in order to prevent possible optical component damage to the laser system. The circuit was able to reliably trigger off input signals to the comparator that were 10 nanoseconds wide and separated by 100 nanoseconds. Faster trigger times (shorter pulse separation) can be expected with better circuit board construction techniques than those used for the prototype.

Many modifications, improvements and substitutions will be apparent to the skilled artisan without departing from the spirit and scope of the present invention as described herein and defined in the following claims.

I claim:

1. An apparatus for controlling prelasing in a resonating cavity of a laser comprising a lasing medium located between a reflecting endplate and a partially transparent-partially reflective endplate and a Q-switch located between the lasing medium and the partially transparent-partially reflective endplate, the Q-switch blocking an optical path from the lasing medium to the partially transparent-partially reflective endplate until the lasing medium is excited to a predetermined level and the Q-switch opens in response to a predetermined Q-switch trigger signal, the prelasing control apparatus comprising:
   a detector for detecting the presence of light beyond the Q-switch, said detector converting an optical signal of any light present to an electrical signal;
   a comparison stage circuit for comparing this detected electrical signal to an established threshold signal value indicative of prelasing, wherein said comparison stage circuit generates a trigger signal if the detected signal exceeds the established threshold signal value; and
   a control stage circuit which receives the trigger signal from said comparison stage and the Q-switch signal, said control stage terminating operation of the laser when the trigger signal from said comparison stage is received before the Q-switch signal is being received.

2. The prelasing control apparatus according to claim 1, further comprising a sync stage circuit which samples the Q-switch trigger signal, and wherein said control stage circuit receives both the sampled Q-switch trigger signal and the trigger signal from said comparison stage circuit, said control circuit terminating operation of the laser when the trigger signal from said comparison stage circuit is received before the sampled Q-switch signal is being received.

3. The prelasing control apparatus according to claim 1, further comprising a delay stage circuit which delays the trigger signal of said comparison stage circuit a predetermined amount.

4. The prelasing control apparatus according to claim 2, further comprising a delayer which delays the sampled Q-switch trigger signal.

5. The prelasing control apparatus according to claim 4, wherein the delayer is adjustable.

6. The prelasing control apparatus according to claim 1, wherein said control stage circuit generates a pulse which terminates operation of the laser when the trigger signal from said comparison stage circuit is received before the sampled Q-switch signal is being received and otherwise generates no signal, whereby the laser continues operation.

7. The prelasing control apparatus according to claim 1, wherein said detector is located beyond the Q-switch and the partially transparent-partially reflective endplate.

8. The prelasing control apparatus according to claim 1, further comprising a potentiometer which adjustably establishes the threshold signal value indicative of prelasing.

9. A method of controlling prelasing in a resonating cavity of a laser comprising a lasing medium located between a reflecting endplate and a partially transparent-partially reflecting endplate and a Q-switch located between the lasing medium and the partially transparent-partially reflective endplate, the Q-switch blocking an optical path from the lasing medium to the partially transparent-partially reflective endplate until the lasing medium is excited to a predetermined level and the Q-switch opens in response to a predetermined Q-switch trigger signal, the method comprising the steps of:
   detecting the presence of light beyond the Q-switch;
   comparing any detected amount of light to an established threshold value indicative of prelasing;
   generating a trigger signal if the detected amount of light exceeds the established threshold value; and
   terminating operation of the laser if this trigger signal is generated before the Q-switch signal occurs.

* * * * *